(12) United States Patent
Duong et al.

(10) Patent No.: US 10,208,624 B2
(45) Date of Patent: Feb. 19, 2019

(54) LUBRICATION OF JOURNAL BEARING DURING CLOCKWISE AND COUNTER-CLOCKWISE ROTATION

(71) Applicant: UNITED TECHNOLOGIES CORPORATION, Farmington, CT (US)

(72) Inventors: Loc Quang Duong, San Diego, CA (US); Xiaolan Hu, San Diego, CA (US); Ernest Boratgis, South Windsor, CT (US); Michael E. McCune, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 315 days.

(21) Appl. No.: 14/769,015

(22) PCT Filed: Dec. 31, 2013

(86) PCT No.: PCT/US2013/078435
§ 371 (c)(1),
(2) Date: Aug. 19, 2015

(87) PCT Pub. No.: WO2014/133669
PCT Pub. Date: Sep. 4, 2014

(65) Prior Publication Data
US 2015/0377066 A1    Dec. 31, 2015

Related U.S. Application Data

(60) Provisional application No. 61/769,476, filed on Feb. 26, 2013.

(51) Int. Cl.
*F01D 25/20*    (2006.01)
*F02C 7/36*    (2006.01)
(Continued)

(52) U.S. Cl.
CPC ............... *F01D 25/20* (2013.01); *F01D 5/02* (2013.01); *F01D 15/08* (2013.01); *F01D 15/12* (2013.01);
(Continued)

(58) Field of Classification Search
CPC . F01D 25/20; F01D 5/02; F01D 15/08; F01D 15/12; F01D 25/16; F01D 25/18;
(Continued)

(56) References Cited

U.S. PATENT DOCUMENTS 2,751,145 A * 6/1956 Olcott .................... F25B 31/02
184/6.5
3,002,350 A * 10/1961 Longstreet ............... F02C 9/36
244/53 R
(Continued)

FOREIGN PATENT DOCUMENTS

DE    102010021894 A1    12/2011
EP    1873358 A2    1/2008
(Continued)

OTHER PUBLICATIONS

Korean Intellectual Property Office, International Application Division, International Search Report, dated Apr. 15, 2014 for PCT/US2013/078435.
(Continued)

*Primary Examiner* — Peter J Bertheaud
*Assistant Examiner* — Dnyanesh Kasture
(74) *Attorney, Agent, or Firm* — Cantor Colburn LLP

(57) ABSTRACT

The present disclosure is applicable to all gear trains using a journal bearing as a means of supporting gear shaft rotation. It is related in some embodiments to a system and method for supplying lubricant to the journal bearings of a gear-turbofan engine gear train when the fan rotor is sub-
(Continued)

jected to a wind-milling condition in both directions, either clockwise or counter-clockwise.

10 Claims, 6 Drawing Sheets

(51) Int. Cl.

| | | |
|---|---|---|
| *F16H 57/04* | (2010.01) | |
| *F01D 25/18* | (2006.01) | |
| *F02K 3/06* | (2006.01) | |
| *F02C 3/107* | (2006.01) | |
| *F01D 5/02* | (2006.01) | |
| *F01D 15/08* | (2006.01) | |
| *F01D 15/12* | (2006.01) | |
| *F01D 25/16* | (2006.01) | |
| *F04C 2/344* | (2006.01) | |
| *F04C 13/00* | (2006.01) | |
| *F04C 15/00* | (2006.01) | |

(52) U.S. Cl.
CPC .............. *F01D 25/16* (2013.01); *F01D 25/18* (2013.01); *F02C 3/107* (2013.01); *F02C 7/36* (2013.01); *F02K 3/06* (2013.01); *F04C 2/3448* (2013.01); *F04C 13/002* (2013.01); *F04C 15/008* (2013.01); *F04C 15/0061* (2013.01); *F16H 57/045* (2013.01); *F16H 57/0423* (2013.01); *F16H 57/0436* (2013.01); *F16H 57/0441* (2013.01); *F16H 57/0471* (2013.01); *F16H 57/0486* (2013.01); *F05D 2220/36* (2013.01); *F05D 2260/40311* (2013.01); *F05D 2260/98* (2013.01)

(58) Field of Classification Search
CPC .... F04C 15/008; F04C 2/3448; F04C 13/002; F04C 15/0061; F05D 2220/36; F05D 2260/98; F05D 2260/40311; F16H 57/0486; F16H 57/0423; F16H 57/0471; F16H 57/045; F16H 57/0441; F16H 57/0436; F02C 3/107; F02C 7/36; F02K 3/06
See application file for complete search history.

(56) References Cited

U.S. PATENT DOCUMENTS

| | | | | |
|---|---|---|---|---|
| 3,091,185 A | * | 5/1963 | Eames, Jr. ............ | F04C 2/3442 418/32 |
| 3,620,654 A | * | 11/1971 | Allen .................... | F04C 27/001 418/125 |
| 3,976,403 A | * | 8/1976 | Jensen ................... | F01C 1/352 418/138 |
| 6,227,961 B1 | * | 5/2001 | Moore .................. | F24F 11/0079 454/229 |
| 7,883,438 B2 | | 2/2011 | McCune | |
| 9,188,216 B2 | | 11/2015 | Nikolaizig et al. | |
| 2005/0064976 A1 | | 3/2005 | Mano et al. | |
| 2006/0260323 A1 | | 11/2006 | Moulebhar | |
| 2013/0004337 A1 | * | 1/2013 | Anderson ............. | F04B 49/065 417/53 |
| 2013/0233650 A1 | | 9/2013 | Nikolaizig | |
| 2013/0319798 A1 | * | 12/2013 | Sheridan ................ | F01D 25/20 184/6.11 |

FOREIGN PATENT DOCUMENTS

| | | |
|---|---|---|
| EP | 1918564 A2 | 5/2008 |
| EP | 2224120 A2 | 9/2010 |
| EP | 2253805 A2 | 11/2010 |
| KR | 1019990056659 A | 7/1999 |
| WO | 2011147615 A1 | 12/2001 |

OTHER PUBLICATIONS

Korean Intellectual Property Office, International Application Division, Written Opinion of the International Searching Authority, dated Apr. 14, 2014 for PCT/US2013/078435.

English Abstact/Translation of DE102010021894A1—dated Dec. 12, 2011; 1 pg. (also published as U.S. Pat. No. 9,188,216 B2—dated Nov. 17, 2015).

European Search Report for Application No. 13876364.4-1752; dated Mar. 16, 2016; 7 pgs.

* cited by examiner

LUBRICATION OF JOURNAL BEARING DURING CLOCKWISE AND COUNTER-CLOCKWISE ROTATION

CROSS REFERENCE TO RELATED APPLICATIONS

This present application is a national stage of and claims the priority benefit of PCT Application Serial No. PCT/US2013/078435, filed Dec. 31, 2013, which claims the priority benefit of U.S. Patent Application Ser. No. 61/769,476 filed Feb. 26, 2013, the text and drawings of which are hereby incorporated by reference in their entireties.

TECHNICAL FIELD OF THE DISCLOSURE

The present disclosure generally related to lubrication of journal bearings and, more specifically, to lubrication of journal bearings during clockwise and counter-clockwise rotation.

BACKGROUND OF THE DISCLOSURE

A gear-turbofan engine consists of an epicyclic gear system coupling the turbine to the fan. In this manner, both the fan and the turbine can operate at each component's own optimum speed. The fan and the turbine may be coupled to one another through a gear train that is supported by a journal bearing system.

During powered operation of the engine, lubricant is delivered to the journal bearings by means of one or multiple oil pumps. This lubricant develops a hydrodynamic film at the journal bearing surface between the gear bore and the journal pin shaft in order to minimize wear as these surfaces move with respect to one another. The oil pump(s) pump lubricant from an oil sump and deliver pressurized oil to the journal bearings. At the journal bearings, oil is squeezed by the rotation of the gears and generates a hydrodynamic film which is necessary to prevent undesirable metal-to-metal contact between the gear bore and the journal pin shaft.

During the non-operating condition of the engine, the oil pump(s) stop running. There is therefore no lubricant delivered to the journal bearings and thus the gear bore is in direct contact with the journal pin shaft under the effect of gravity. Under this circumstance, any relative motion between the gear bore inner surface and the journal pin outer surface can cause premature wear and undesirable damage to these surfaces.

In the engine non-operating mode, rotation of the rotor, and hence the gears, can be caused by wind-milling, a phenomenon resulting from ambient wind blowing through the engine, causing the turbofan engine to rotate due to forces imparted by the wind to engine surfaces. Depending on the wind direction, either toward the fan blade through the nacelle inlet or toward the turbine blade through the exhaust duct, the rotor can rotate in either direction, clockwise or counter-clockwise with respect to the pilot view.

Currently, there are no known means to deliver oil effectively to the journal bearings when the wind-milling phenomenon occurs in both rotational directions. The present disclosure is related to a system and method of supplying lubricant to the journal bearings of a gear-turbofan engine operating with a gear train when the rotor is subjected to a wind-milling condition in both directions, either clockwise or counter-clockwise. The presently disclosed embodiments will also find applicability in other applications where lubrication is to be applied when a gear train is operating in either clockwise or counter-clockwise directions.

SUMMARY OF THE DISCLOSURE

In one embodiment, a gear system is disclosed, comprising: a shaft; and a lubrication system, the lubrication system comprising: a gear including a gear bearing surface, the gear operatively driven by the shaft; and a pump operatively driven by the gear, the pump including a pump inlet and a pump outlet; wherein rotation of the gear below a predetermined operational speed range in either direction causes the pump to transfer lubricant to the gear bearing surface.

In another embodiment, a turbofan engine is disclosed, comprising: a fan; a fan shaft operably coupled to the fan; a gear including a gear bearing surface, the gear operatively driven by the fan shaft; and a pump operatively driven by the gear, the pump including a pump inlet and a pump outlet; wherein rotation of the fan shaft in either direction causes the pump to transfer lubricant to the gear bearing surface when the engine is in a non-operational mode.

Other embodiments are also disclosed.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present disclosure is applicable to all gear trains using a journal bearing as a means of supporting gear shaft rotation. In an embodiment, lubricant is supplied to the journal bearings of a gear-turbofan engine gear train when the fan rotor is subjected to a wind-milling condition in both directions, either clockwise or counter-clockwise.

Figure 1:
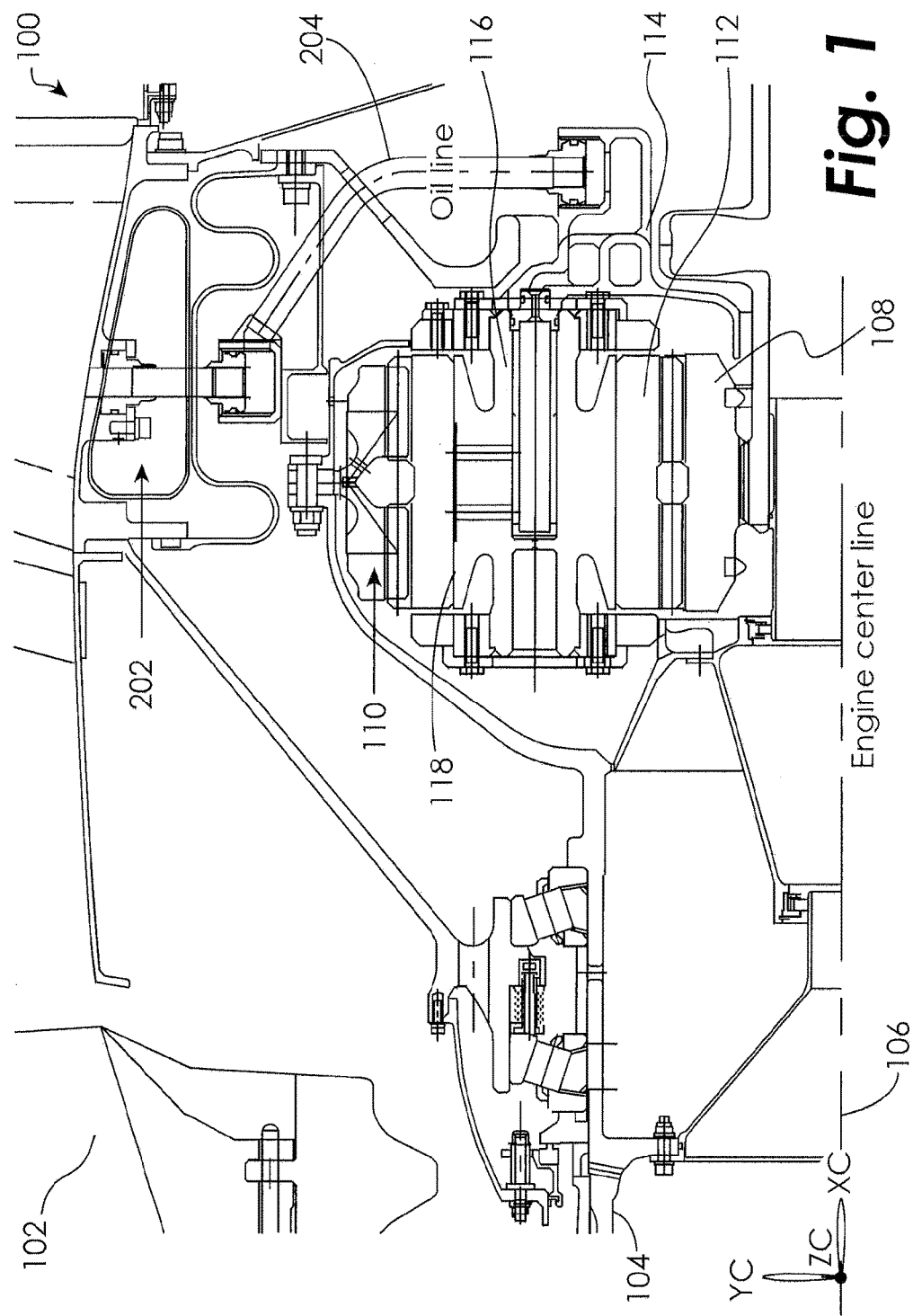
FIG. 1 is a partial cross-section of a gear-turbofan engine incorporating an auxiliary lubricant tank according to an embodiment.

One embodiment of an engine, such as, for example, a gear-turbofan engine, is shown in partial cross-section in FIG. 1 and indicated generally at 100. The engine 100 comprises a PW 1000G Gear Turbofan Series engine manufactured by Pratt & Whitney®. A fan blade 102 is attached to a fan shaft 104 which rotates about an engine centerline 106. An epicyclic gear-train includes a sun gear 108, a ring gear 110, and a set of planetary gears 112 supported by a carrier frame 114. Each planetary gear 112 is supported by a journal bearing system. The planetary gear 112 rotates around a journal bearing 116 (having a journal bearing surface 118) that is supported by the carrier frame 114 at its two ends as shown in FIG. 1.

During powered operation of the engine 100, which operates within a design operational speed range, lubricant is delivered to the journal bearings 116 by means of one or multiple oil pumps (not shown). At the journal bearings 116, oil is squeezed by the rotation of the planetary gears 112 and generates a hydrodynamic film at the journal bearing surface 118. The hydrodynamic film is necessary to prevent undesirable metal-to-metal contact between the planetary gear 112 and the journal bearing 116. As explained above, during the non-operating condition of the engine 100, the oil pump(s) do not operate. As a result, no lubricant is delivered to the journal bearings 116 and thus the planetary gear 112 may come into direct contact with the journal bearing 116. Under this circumstance, any relative motion between the planetary gear 112 inner surface and the journal bearing surface 118 may cause premature wear and undesirable damage to either or both of these surfaces.

When the engine 100 is in the non-operating mode, wind-milling, which is a phenomenon resulting from ambient wind blowing through the engine 100, may rotate the rotor below the operational speed range, causing the planetary gears 112 and/or the engine 100 to rotate. Depending on the wind direction, either aft toward the fan blade 102 through the nacelle inlet or stern toward the turbine blade through the exhaust duct, the rotor can rotate in either the clockwise or counter-clockwise direction.

Figure 2:
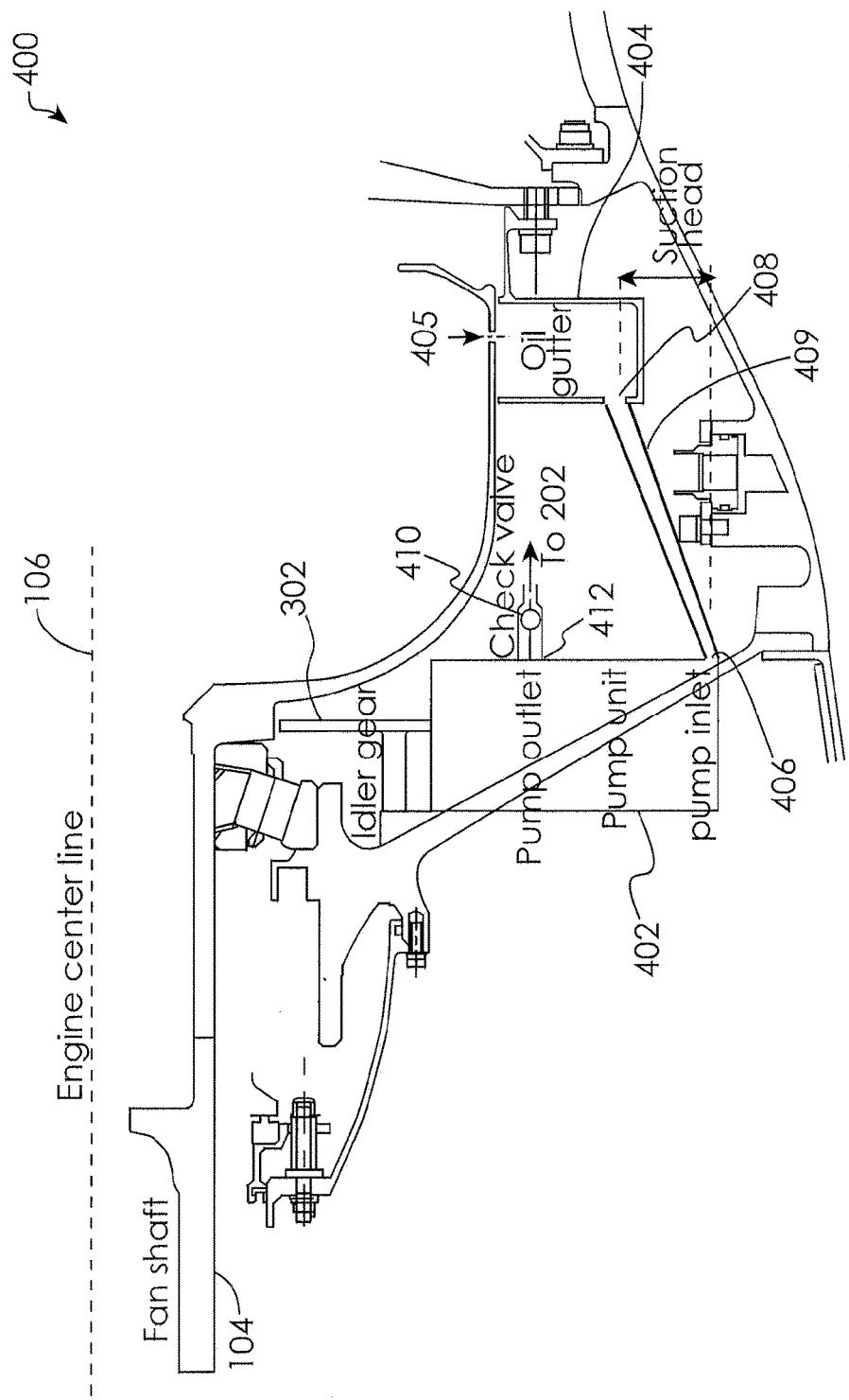
FIG. 2 is a partial cross-section of a gear-turbofan engine showing a pump and lubricant passages for lubricating the turbofan engine during wind-milling operation according to an embodiment.

In some embodiments, the wind-milling lubrication system disclosed herein consists of an auxiliary oil tank, an oil gutter, a bi-directional pump, and gear train. The auxiliary oil tank 202 may be located at the top of the epicyclic gear train so that oil will drip to the journal bearings 116 through oil line 204 by gravity. Although the embodiments disclosed herein make reference to oil as the lubricant, those skilled in the art will recognize that any appropriate lubricant may be used, whether naturally occurring or synthetic. Referring now to FIG. 2, lubricant supplied to the journal bearing 116 from the tank 202 moves by force of gravity to the bottom of the epicyclic gear train, eventually collecting in gutter 404, which may be located at the bottom of the epicyclic gear train below the engine centerline 106. The gutter 404 collects the lubrication oil after it drips from the gear train through one or more collector holes 405.

The rotor speed under a wind-milling condition is a fraction of the engine operational speed range, therefore the bi-directional pump disclosed herein is configured to operate below the operational speed range. A schematic representation of one embodiment auxiliary oil pump system is indicated generally at 400. The pump 402 is driven by the fan shaft 104 through the idler gear 302 during wind-milling rotation (as described in greater detail hereinbelow with respect to FIG. 3), and delivers oil from the gutter 404 back to the auxiliary oil tank 202 (see FIG. 1). The pump outlet 412 is coupled to an inlet on the auxiliary oil tank 202 to resupply oil to the top of the engine 100. A check valve 410 at the pump outlet 412 prevents backflow of oil through the pump 402. The pump inlet 406 is positioned below the gutter 404 outlet 408 to provide a positive suction head as oil travels from the gutter 404 outlet 408 to the pump inlet 406 through an oil inlet line 409. In an embodiment, the gutter 404 is not included, and the lubrication oil is collected by other means, such as by a plurality of collector holes 405 and oil inlet lines 409.

Figure 3:
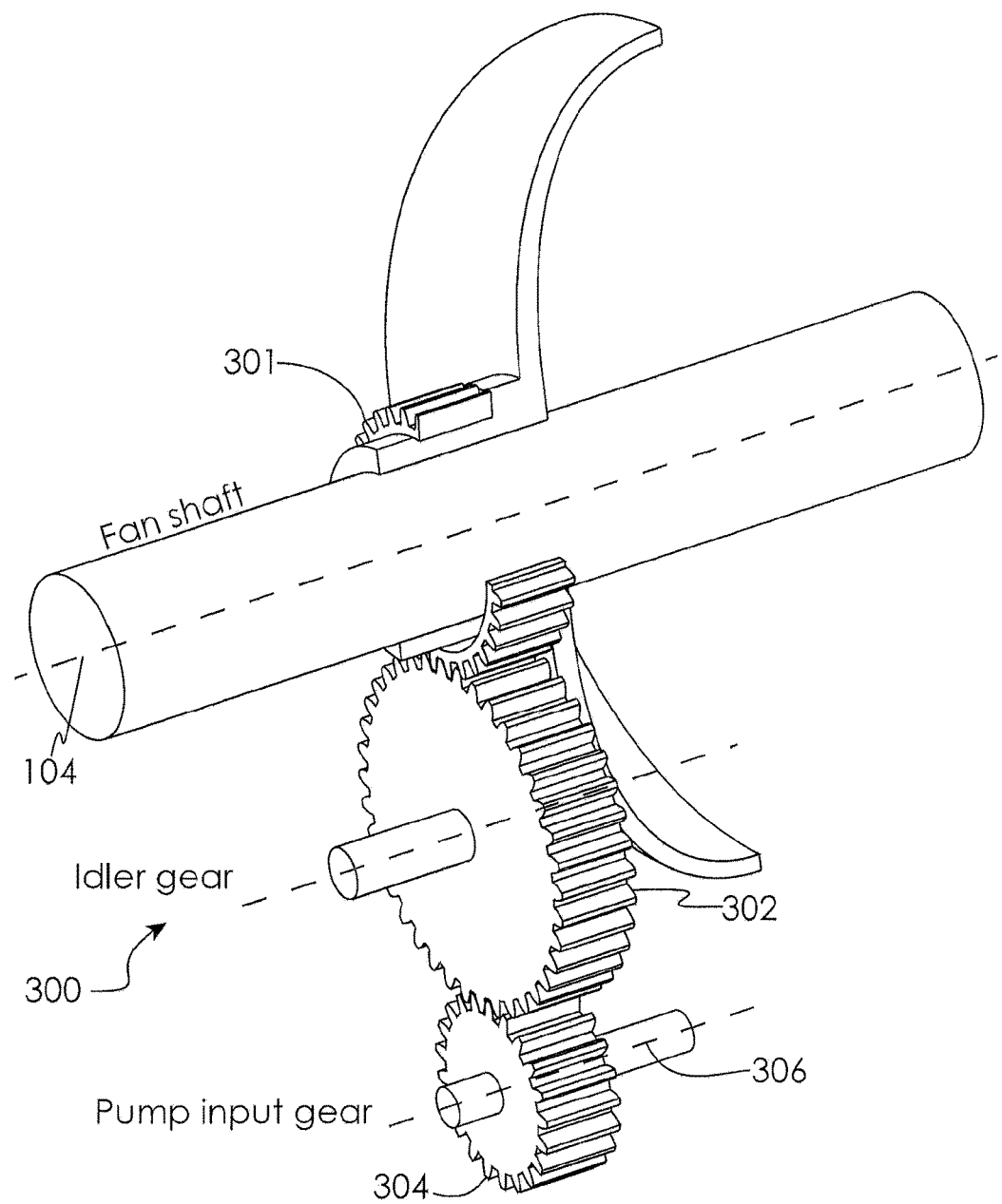
FIG. 3 is a perspective view of a gear train arrangement for driving an auxiliary lubricant pump for lubricating a turbofan engine during wind-milling operation according to an embodiment.

FIG. 3 illustrates in greater detail how the pump 402 is powered by the fan shaft 104. Power is extracted from the fan shaft 104 through a gear train 300 to bring the speed of the bi-directional pump to its optimum operational speed through a chosen gear ratio, as explained below. The engine fan shaft 104 includes a shaft gear 301 that drives an idler gear 302. The idler gear 302 in turns meshes with a driving gear 304 that forms part of the driving mechanism of the pump. In one embodiment, the driving gear 304 rotates about the pump rotor centerline 306. The overall gear ratio of the idler gear 302 and driving gear 304 (and any other optional gears that may be used in the gear train) is selected to transition between an expected fan wind-milling speed range, which is much less than the operational speed range of the engine, and the speed at which the pump operates at optimum efficiency. In some embodiments, the pump may be disengaged from the engine fan shaft 104 when the engine is in a non-operational mode. An operational mode may be indicated by the engine being in a running state and producing power. For example, in one embodiment the pump may be disengaged when an Engine-Start button is activated, indicating that the engine is being placed into a running state, to name just one non-limiting example. An operational mode may also be indicated by the engine operating within a predetermined operational speed range. For example, in one embodiment the pump may be disengaged when it is determined that the engine is not (or soon will not be) below the operational speed range, such as by using a spring mechanism (not shown) reacting to centrifugal force at a pre-determined disengagement speed, to name just one non-limiting example. It will be appreciated from the present disclosure that the means used to disengage the pump when the engine is in a non-operational mode is not critical.

Figure 4:
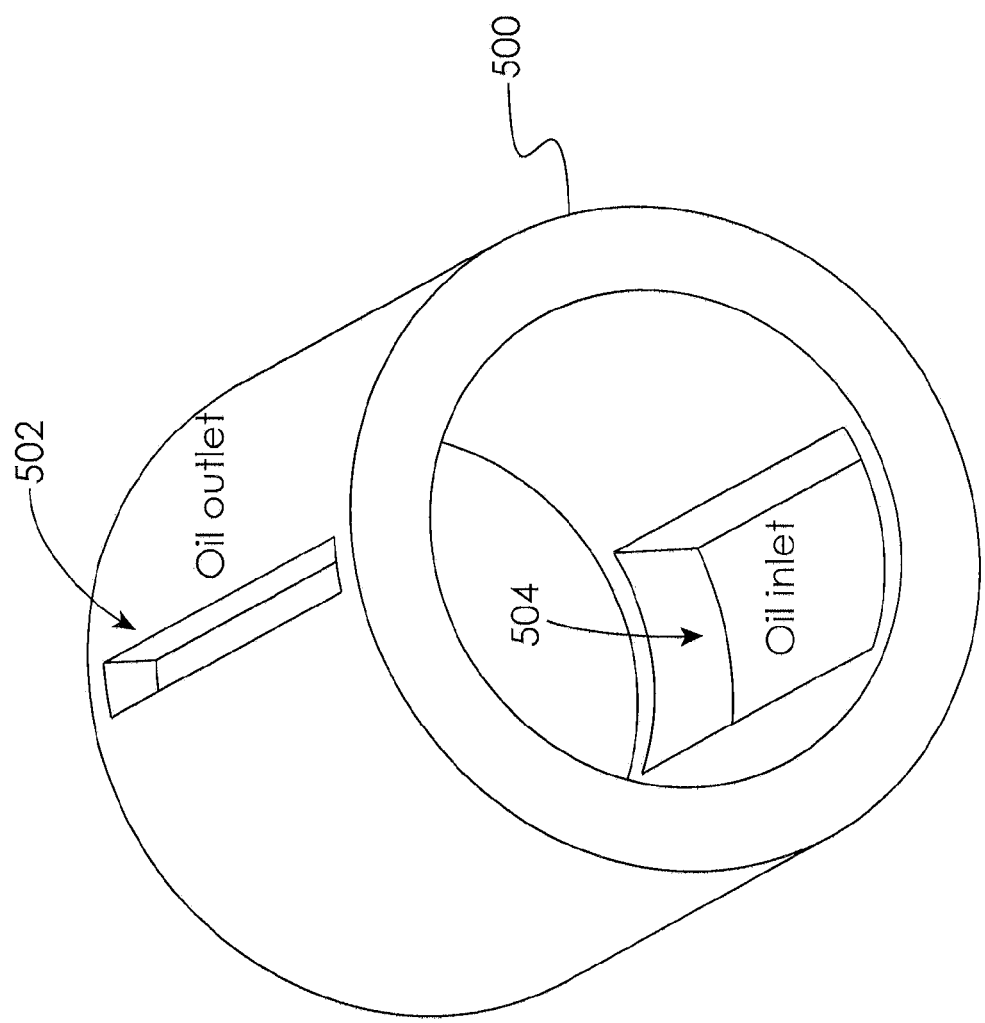
FIG. 4 is a perspective view of a pump inner housing according to an embodiment.

In some embodiments, the pump 402 is of the rotary vane type, consisting of a rotor and an internal housing which is connected to the outer housing by any desired means, such as a woodruff key (not shown), a press fit, or a spline connection, to name just a few non-limiting examples. The manner in which the internal and external housings are connected is not critical. As shown in FIG. 4, the inner housing 500 of the auxiliary pump 402 is in some embodiments a hollow cylinder having two ports: one oil outlet port 502 and one oil inlet port 504. In an embodiment, the two ports are located generally opposite one another with the inlet port 504 located at the bottom. The oil inlet port communicates with pump inlet 406, while the pump outlet port 502 communicates with pump outlet 412.

Figure 5:
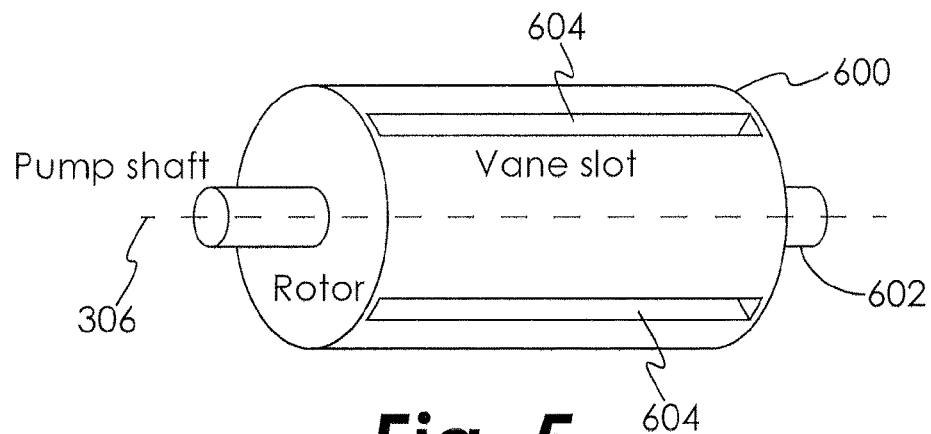
FIG. 5 is a perspective view of rotary vane pump rotor according to an embodiment.

As shown in FIG. 5, the core of the pump consists of a cylindrical rotor 600 that rotates on a pump shaft 602. The pump shaft 602 rotates about the pump centerline 306. The cylindrical rotor 600 includes a number of vane slots 604 formed therethrough. One embodiment comprises four vane slots 604 that carry four moving vanes 702 (see FIG. 6), although other embodiments may have a fewer or greater number of vane slots and vanes.

Figure 6:
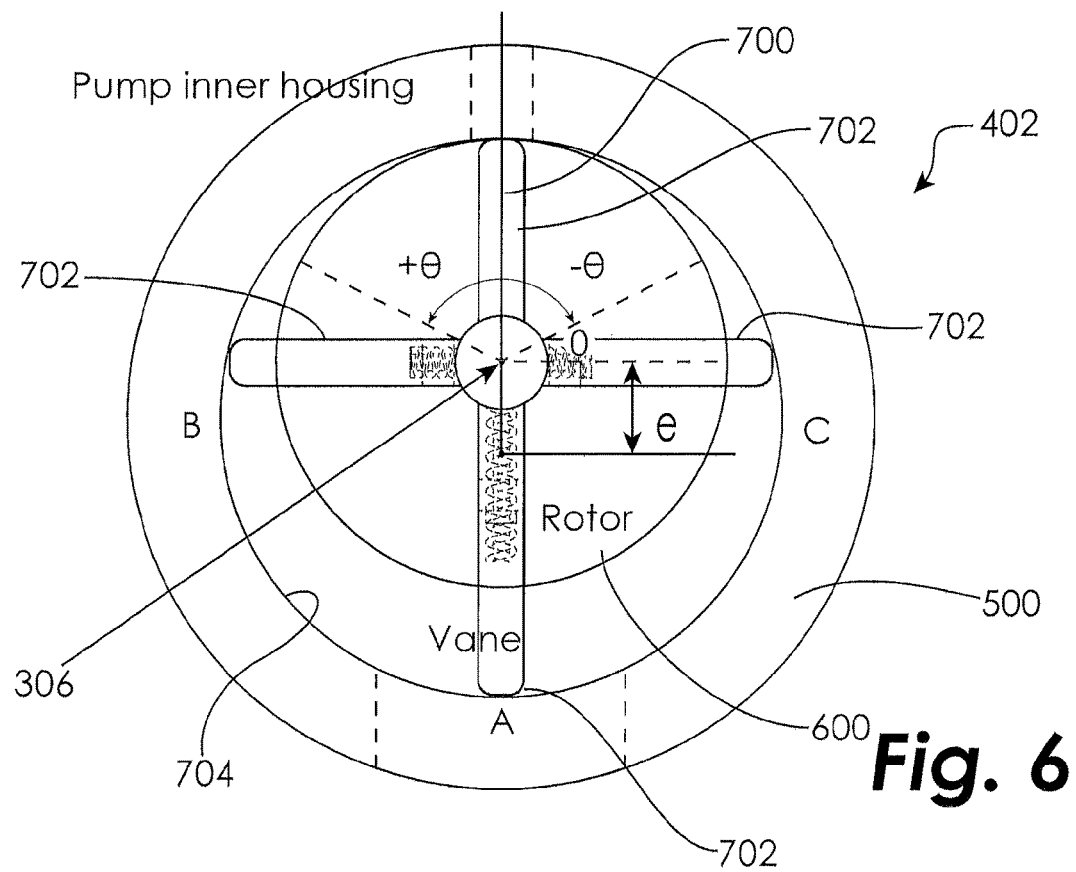
FIG. 6 is a cross-sectional view of a rotary vane pump according to an embodiment.

As shown in FIG. 6, the pump 402 rotor 600 is mounted eccentrically with respect to the pump inner housing 500 by a distance e. In the embodiment of FIG. 6, the cross-section of the pump 402 inside contour of the inner housing 500 is of a non-circular geometry. Other embodiments may have other geometries, including circular. Each vane slot 604 carries a vane 702 therein (described in greater detail hereinbelow with respect to FIG. 7). The vanes 702 are free to slide within the vane slots 604 and are biased toward the inside surface 704 of the inner housing 500.

Considering positive rotation as clockwise in the view of FIG. 6, the rotor 600 and the pump inner housing 500 have generally zero gap between the rotor 600 and the inner surface 704 between the angles of +⊖ and −⊖ about the pump centerline 700. In the illustrated embodiment, ⊖ is 45 degrees, but those skilled in the art will recognize from the present disclosure that ⊖ may be less than or greater than 45 degrees. Additionally, the +⊖ and −⊖ angles do not have to be equal in all embodiments. In some embodiments, the +⊖ angle is greater than the −⊖ angle because the +⊖ region relates to clockwise rotation of the engine rotor (as discussed further below), and a turbofan engine will wind-mill in the clockwise direction more often than in the counterclockwise direction, as wind blowing on the fan is more likely to rotate the engine than wind blowing into the exhaust duct.

Consider cases in which |⊖|≥45 degrees. A positive angle [+] is for clockwise rotation of the pump rotor, while a negative angle [−] is for the reverse rotation case. Within this angular range, oil is pushed out of the oil outlet 502 at the top to the pump outlet 412. During rotation of the pump rotor 600, the vanes 702 tend to slide out of their respective vane slots 604 under the effect of centrifugal force, while the radial motion is restrained by the interaction with the inner surface 704 of the pump inner housing 500.

Figure 7:
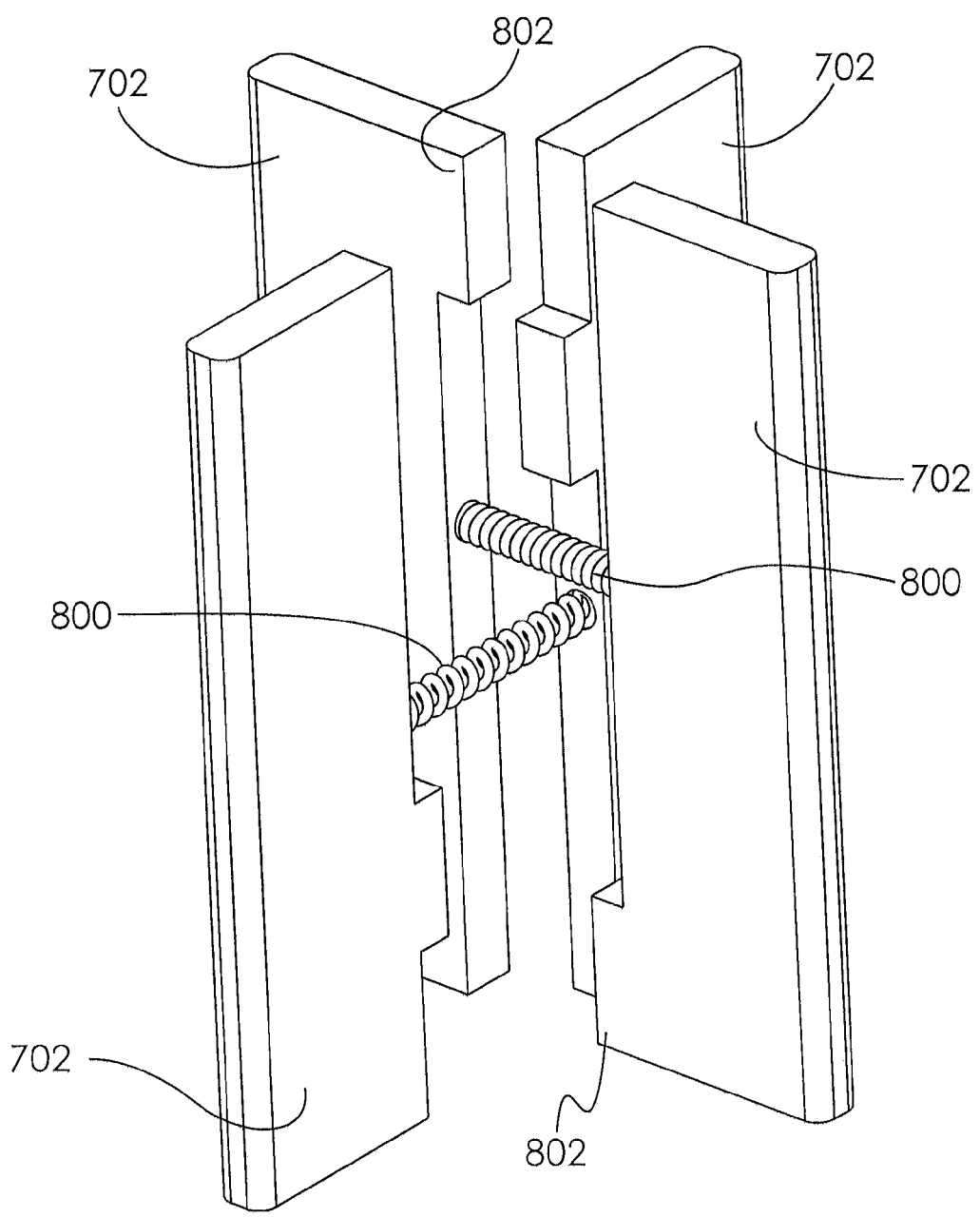
FIG. 7 is a perspective view of vanes of a rotary vane pump according to an embodiment.

In the illustrated embodiment, the vanes 702 exist in pairs and are positioned generally opposite to one another. As shown in FIG. 7, in an embodiment, in order to overcome the lack of centrifugal force due to low wind-milling speed (i.e., when the speed of rotation of the pump shaft 602 is low), an extension device, such as a compressed spring 800 is placed between each pair of opposing vanes 702, such that the expanding force of the spring 800 is always urging the pair of vanes 702 away from one another and toward engagement with the inner surface 704 of the pump inner housing 500. It will be appreciated by those skilled in the art in view of the present disclosure that the extension device may comprise any device operative to force the vanes away from one another, such as a chamber filled with an incompressible fluid, to name just one non-limiting example. The extensions 802 on each vane 702 serve to limit the amount of travel of the vane 702 toward the center of the rotor 600.

When the wind blows toward the fan blade 102 through the nacelle, the rotor rotates in the normal operating direction. Assuming the normal rotating direction is clockwise, the vane 702 at location A (see FIG. 6) will extend, sweeping the inlet oil and compressing it, and as the pump rotor 600 rotates the vane to location B, the compressed oil is delivered to the oil outlet 502 located at the top.

When the wind blows toward the turbine blade through the exhaust duct of the engine, the rotor rotates in the opposite direction of the normal operating condition (i.e., in the counter-clockwise direction). The same phenomenon occurs in the reverse direction. Vane 702 at location A will extend, sweep the inlet oil and compress it, and as the pump rotor 600 rotates the vane to location C, the compressed oil is delivered to the oil outlet 502 located at the top.

One option of preventing wear and tear of the pump 402 during normal (powered) operational conditions is to decouple the pump 402 from the driver. In an embodiment, the pump 402 may be connected to the idler gear 302 through a disconnectable mechanism such as a spring-frictional disc or equivalent system (not shown), as will be appreciated by those skilled in the art after reading the present disclosure. At high speed, the disconnectable mechanism is engages the pump 402 from the idler gear 302, thus protecting the pump 402 from wear and tear.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A lubrication for a gas turbine engine, the gas turbine engine comprising a fan, a fan drive gear system, a fan shaft that drives the fan and that is driven by the fan drive gear system, and the lubrication system providing lubrication to the fan drive gear system, the lubrication system comprising:
   a pump gear rotationally coupled to the fan shaft to be continuously driven by the fan shaft when the fan shaft rotates in either rotational direction due to operation of the fan drive gear system in one rotational direction and windmilling of the fan in another rotational direction; and
   an axially eccentric rotary vane pump coupled to the pump input gear to be continuously driven by the pump input gear,
   the rotary vane pump comprising:
   (i) an axially elongated cylindrical housing that remains stationary during rotation of the pump input gear in and between either rotational direction, the housing having an axially extending inlet slot and an axially extending outlet slot circumferentially centered on opposing ends of an axis extending radially through the housing, the inlet slot having a circumferential span that is less than a quarter of a circumference of the housing and larger than a circumferential span of the outlet slot,
   (ii) an axially elongated and axially eccentric cylindrical rotor within the hosing, the rotor having a rotational axis that is closer to the housing outlet slot than the housing inlet slot, the rotor being driven by the pump input gear, the rotor the having a plurality of axially elongated slots, the plurality of rotor slots being greater than two slots circumferentially spaced about the rotor to circumferentially divide the rotor into circumferentially equal segments,
   (iii) a plurality of axially elongated vanes extending through the rotor slots toward the housing, the vanes being spring-biased from the rotational center of the rotor to continuously and directly contact the housing, and
   whereby when the fan shaft rotates in either direction, the plurality of vanes rotate about the center of the rotor and the pump transfers lubricant from the pump outlet in the housing to the fan drive gear system.

2. The system of claim 1, further comprising:
   a tank for holding a quantity of lubricant, the tank including a tank inlet and a tank outlet, the tank outlet operative to supply the lubricant to the gear bearing surface by force of gravity;
   a gutter for collecting lubricant from the gear bearing surface, the gutter including a gutter outlet;
   a lubricant inlet line coupled to the gutter outlet and the pump inlet for transfer of lubricant therebetween; and
   a lubricant outlet line coupled to the pump outlet and the tank inlet for transfer of lubricant therebetween;
   wherein wind-milling of the fan drive gear system causes rotation of the shaft, which powers the pump, causing lubricant to be transferred from the gutter outlet, through the lubricant inlet line, to the pump inlet, to the pump outlet, through the lubricant outlet line to the tank inlet.

3. The system of claim 1, further comprising
a shaft gear coupled to the fan shaft and an idler gear mesh-wise coupled to the shaft gear to be continuously driven by the fan shaft when the fan shaft rotates in either rotational direction, and
the pump input gear being mesh-wise coupled to the idler gear so as to be operatively driven by the fan shaft in either rotational direction.

4. The system of claim 1, wherein the rotary vane pump further comprises: a compression spring disposed between two of said vanes; wherein the compression spring is operative to bias the two vanes away form one another.

5. The system of claim 1, wherein the lubricant comprises oil.

6. A gas turbine engine comprising:
a fan,
a fan drive gear system,
a fan shaft that drives the fan and that is driven by the fan drive gear system, and
a lubrication system providing lubrication to the fan drive gear system, the lubrication system comprising:
a shaft gear coupled to the fan shaft and an idler gear mesh-wise coupled to the shaft gear to be continuously driven by the fan shaft when the fan shaft rotates in either rotational direction due to operation of the fan drive gear system in one rotational direction and wind-milling of the fan in another rotational direction,
a pump input gear rotationally coupled to the fan shaft to be continuously driven by the fan shaft when the fan shaft rotates in either rotational direction due to operation of the fan drive gear system in one rotational direction and windmilling of the fan in another rotational direction, and
an axially eccentric rotary vane pump coupled to the pump input gear to be continuously driven by the pump input gear,
the rotary vane pump comprising:
(i) an axially elongated and cylindrical housing that remains stationary during rotation of the pump input gear in and between either rotational direction, the housing having an axially extending inlet slot and an axially extending outlet slot circumferentially centered on opposed ends of an axis extending radially through the housing, the inlet slot having a circumferential span that is less than a quarter of a circumference of the housing and larger than a circumferential span of the outlet slot,
(ii) an axially elongated and axially eccentric cylindrical rotor within the hosing, the rotor having a rotational axis that is closer to the housing outlet slot than the housing inlet slot, the rotor being driven by the pump input gear, the rotor the having a plurality of axially elongated slots, the plurality of rotor slots being greater than two slots circumferentially spaced about the rotor to circumferentially divide the rotor into circumferentially equal segments,
(iii) a plurality of axially elongated vanes extending through the rotor slots toward the housing, the vanes being spring-biased from the rotational center of the rotor to continuously and directly contact the housing, and
whereby when the fan shaft rotates in either direction, the plurality of vanes rotate about the center of the rotor and the pump transfers lubricant from pump outlet in the housing to the fan drive gear system.

7. The engine of claim 6, further comprising:
a tank for holding a quantity of lubricant, the tank including a tank inlet and a tank outlet, the tank outlet operative to supply the lubricant to the gear bearing surface by force of gravity;
a gutter for collecting lubricant from the gear bearing surface, the gutter including a gutter outlet;
a lubricant inlet line coupled to the gutter outlet and the pump inlet for transfer of lubricant therebetween; and
a lubricant outlet line coupled to the pump outlet and the tank inlet for transfer of lubricant therebetween;
wherein wind-milling of the engine causes rotation of the fan, which causes rotation of the fan shaft, which powers the pump, causing lubricant to be transferred from the gutter outlet, through the lubricant inlet line, to the pump inlet, to the pump outlet, through the lubricant outlet line to the tank inlet.

8. The engine of claim 6, wherein:
the pump input gear being mesh-wise coupled to the idler gear so as to be operatively driven by the fan shaft in either rotational direction.

9. The engine of claim 6, wherein the rotary vane pump further comprises:
a compression spring disposed between two of said vanes;
wherein the compression spring is operative to bias the two vanes away from one another.

10. The engine of claim 6, wherein the lubricant comprises oil.

* * * * *